United States Patent
Tomonari

(10) Patent No.: US 10,017,629 B2
(45) Date of Patent: Jul. 10, 2018

(54) POLYETHYLENE-2,6-NAPHTHALATE COMPOSITION WITH EXCELLENT BLOW MOLDABILITY, AND MOLDED PRODUCT THEREOF

(71) Applicant: TEIJIN LIMITED, Osaka-shi, Osaka (JP)

(72) Inventor: Yasuhiko Tomonari, Osaka (JP)

(73) Assignee: TEIJIN LIMITED, Osaka (JP)

( * ) Notice: Subject to any disclaimer, the term of this patent is extended or adjusted under 35 U.S.C. 154(b) by 0 days.

(21) Appl. No.: 15/116,682

(22) PCT Filed: Feb. 19, 2015

(86) PCT No.: PCT/JP2015/054544
§ 371 (c)(1),
(2) Date: Aug. 4, 2016

(87) PCT Pub. No.: WO2015/125846
PCT Pub. Date: Aug. 27, 2015

(65) Prior Publication Data
US 2016/0347934 A1    Dec. 1, 2016

(30) Foreign Application Priority Data

Feb. 20, 2014  (JP) .................................. 2014-030850

(51) Int. Cl.
*C08G 63/189*  (2006.01)
*C08K 5/5317*  (2006.01)
(Continued)

(52) U.S. Cl.
CPC .......... *C08K 5/5317* (2013.01); *C08G 63/189* (2013.01); *C08J 7/00* (2013.01);
(Continued)

(58) Field of Classification Search
CPC .. C08L 67/02; C08K 3/02; C08K 3/08; C08K 3/32; C08K 2003/0843; C08K 2003/0875;
(Continued)

(56) References Cited

U.S. PATENT DOCUMENTS 5,019,640 A    5/1991   Engel-Badar et al.
5,837,800 A    11/1998  Suzuki et al.
(Continued)

FOREIGN PATENT DOCUMENTS

CN    101970733 A    2/2011
EP    0572540 A1    12/1993
(Continued)

OTHER PUBLICATIONS

JP 2003113234 A, Apr. 2003, Derwent Ab.*
(Continued)

*Primary Examiner* — Satya Sastri
(74) *Attorney, Agent, or Firm* — Sughrue Mion, PLLC

(57) ABSTRACT

The object of the present invention is to provide a highly crystalline polyethylene-2,6-naphthalate composition by achieving high molecular weight of PEN, wherein the polyethylene-2,6-naphthalate composition has greatly improved blow moldability and provides molded products having excellent hue, excellent weathering resistance, and additionally excellent transparency. The above-mentioned problems can be solved by a polyethylene-2,6-naphthalate composition comprising a specific phosphoric acid which is a phosphorus compound, cobalt element derived from a cobalt compound, manganese element derived from a manganese compound, and antimony element derived from an antimony compound, wherein the content of each of the elements simultaneously satisfies the following expressions (1) to (4):

$10 \leq Co \leq 30$ mmol %  (1)

$0.50 \leq P/Mn \leq 1.28$  (2)

(Continued)

$10 \leq Sb \leq 25$ mmol %                              (3)

$0.60 \leq IV \leq 1.50$ dL/g                             (4).

7 Claims, 1 Drawing Sheet

(51) Int. Cl.
    *C08J 7/00*          (2006.01)
    *C08K 3/08*         (2006.01)

(52) U.S. Cl.
    CPC ............ *C08K 3/08* (2013.01); *C08G 2120/00* (2013.01); *C08J 2367/02* (2013.01); *C08K 2003/0843* (2013.01); *C08K 2003/0875* (2013.01)

(58) Field of Classification Search
    CPC ............... C08K 5/5317; C08G 2120/00; C08J 2367/02; C08J 7/00
    See application file for complete search history.

(56) References Cited

U.S. PATENT DOCUMENTS

| | | | |
|---|---|---|---|
| 5,898,060 A * | 4/1999 | Suzuki | C08G 63/189 428/35.7 |
| 8,158,718 B2 * | 4/2012 | Shimada | D01D 5/098 264/210.8 |
| 2011/0040009 A1 | 2/2011 | Shimida et al. | |

FOREIGN PATENT DOCUMENTS

| | | |
|---|---|---|
| EP | 0899285 A2 | 3/1999 |
| EP | 1491572 A1 | 12/2004 |
| EP | 1550683 A1 | 7/2005 |
| EP | 2261403 A1 | 12/2010 |
| JP | H06-200131 A | 7/1994 |
| JP | 9-208678 A | 8/1997 |
| JP | 2815069 B2 | 10/1998 |
| JP | 11-60705 A | 3/1999 |
| JP | 11-158257 A | 6/1999 |
| JP | 3249287 B2 | 1/2002 |
| JP | 2003113234 A * | 4/2003 |
| JP | 2004107559 A * | 4/2004 |
| JP | 2004-300652 A | 10/2004 |
| JP | 3681493 B2 | 8/2005 |
| JP | 2007-254702 A | 10/2007 |
| JP | 2010-163547 A | 7/2010 |
| JP | 5161850 B2 | 3/2013 |
| JP | 2013-234249 A | 11/2013 |

OTHER PUBLICATIONS

JP 2004107559 A, Apr. 2004, Derwent Ab.*
Communication dated Apr. 18, 2017, issued from the Japan Patent Office in corresponding Japanese Patent Application No. 2016-504146.
Communication dated Oct. 19, 2016, from the European Patent Office in European Application No. 15752229.3.
International Search Report for PCT/JP2015/054544 dated May 19, 2015 [PCT/ISA/210].

* cited by examiner

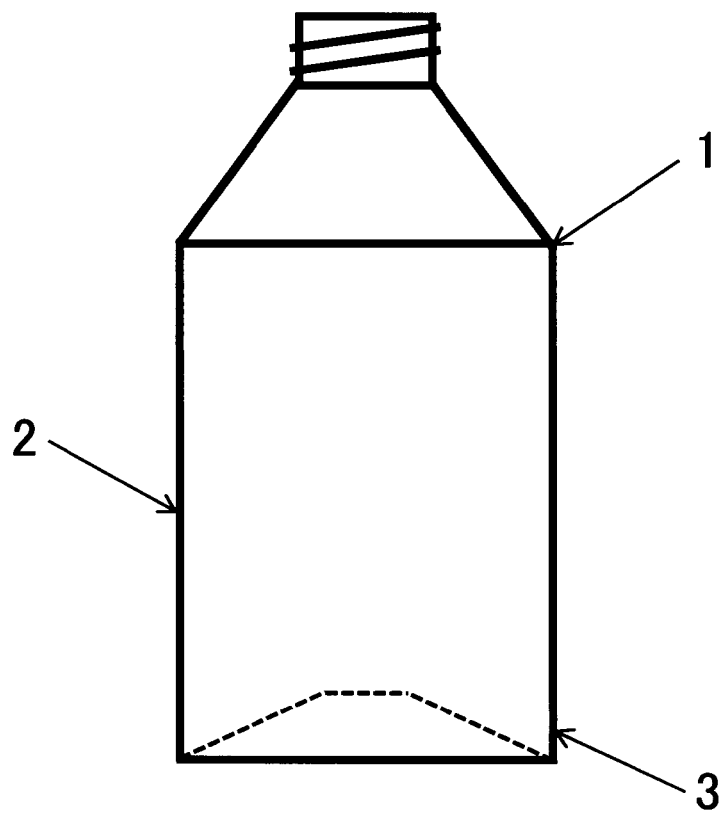

POLYETHYLENE-2,6-NAPHTHALATE COMPOSITION WITH EXCELLENT BLOW MOLDABILITY, AND MOLDED PRODUCT THEREOF

CROSS REFERENCE TO RELATED APPLICATIONS

This application is a National Stage of International Application No. PCT/JP2015/054544, filed on Feb. 19, 2015 (which claims priority from Japanese Patent Application No. 2014-030850, filed on Feb. 20, 2014), the contents of which are incorporated herein by reference in their entirety.

TECHNICAL FIELD

The present invention relates to a polyethylene-2,6-naphthalate composition having excellent blow moldability, excellent transparency, and additionally excellent weathering resistance (inhibition of strength degradation due to ultraviolet), and molded products thereof. The polyethylene-2,6-naphthalate composition obtained by the present invention can be suitably used for pressure vessel applications such as fire extinguishers and air tanks.

BACKGROUND ART

Polyethylene naphthalate resin, having excellent characteristics such as its heat resistance, transparency, gas barrier properties, and weathering resistance (ultraviolet absorbing ability), has been extended to hollow molded products such as bottles and vessels for carbonated beverages, alcoholic beverages, water, pharmaceutical products, and cosmetics, sheets for various applications, films, thermally-molded products, school lunch tableware, and injection-molded products for other applications. Furthermore, extension of the resin to pressure vessels such as model 20 fire extinguishers and air tanks has been attempted recently by use of its excellent properties. However, the polyethylene naphthalate resin, because of having lower crystallinity and moldability (in particular, blow moldability into PET bottles and the like) than those of polyethylene terephthalate resin (PET), is currently difficult to mold into large bottles such as model 20 fire extinguishers (see PTL 1 and PTL 2). Meanwhile, a polyethylene naphthalate composition has been developed having improved blow moldability. However, blow-molded bottles produced by using these polyethylene naphthalate compositions are not preferable because the bottles cause significant hue deterioration and thus has inferior visibility of their contents (see PTL 3 and PTL 4, for example). This hue problem interferes, for example, with periodic check of extinguishant in fire extinguishers, which makes the problem more serious.

CITATION LIST

Patent Literature

[PTL 1] Japanese Patent No. 3681493
[PTL 2] Japanese Patent No. 3249287
[PTL 3] Japanese Patent Application Laid-Open Publication No. 2010-163547
[PTL 4] Japanese Patent No. 5161850

SUMMARY OF INVENTION

Technical Problem

The present invention has been achieved as a result of investigations to solve the above-described problems of the conventional techniques, and has an object to provide a highly crystalline polyethylene-2,6-naphthalate composition by adding a hue-adjusting agent derived from a cobalt compound and a crystallization nucleating agent which is a phosphorus compound represented by the following formula (I) and achieving high molecular weight of polyester, wherein the polyethylene-2,6-naphthalate composition has greatly improved blow moldability and the molded products obtained have an excellent hue, excellent weathering resistance, and additionally excellent transparency.

Solution to Problem

The present inventors have made extensive investigations to solve the above-described problems and, as a result, have found that a polyethylene-2,6-naphthalate composition can be provided, which has easy moldability and has hue, transparency, high crystallinity, and additionally weathering resistance (inhibition of strength degradation due to ultraviolet) necessary for its molded products, thereby having reached the present invention. Namely, the present invention is:

A polyethylene-2,6-naphthalate composition comprising a phosphorus compound represented by the following formula (I), cobalt element derived from a cobalt compound, manganese element derived from a manganese compound, and antimony element derived from an antimony compound, the content of each of the elements simultaneously satisfying the following expressions (1) to (4). The present inventors also have found that the polyethylene-2,6-naphthalate composition can solve the above-described problems.

[Chem. 1]

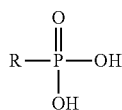

(I)

wherein R represents an alkyl group having 1 to 12 carbon atoms, an aryl group having 6 to 12 carbon atoms, or a benzyl group;

$$10 \leq Co \leq 30 \text{ mmol \%} \tag{1}$$

$$0.50 \leq P/Mn \leq 1.28 \tag{2}$$

$$10 \leq Sb \leq 25 \text{ mmol \%} \tag{3}$$

$$0.60 \leq IV \leq 1.50 \text{ dL/g} \tag{4}$$

in the expressions (1) to (4), Co, P, Mn, and Sb respectively represent the content of the cobalt element derived from the cobalt compound, the content of the phosphorus compound represented by the formula (I), the content of the manganese element derived from the manganese compound, and the content of the antimony element derived from the antimony compound, per mole of a dicarboxylic acid component constituting polyethylene-2,6-naphthalate in the polyethylene-2,6-naphthalate composition, and IV represents the intrinsic viscosity of the polyethylene-2,6-naphthalate composition.

Advantageous Effects of Invention

The polyethylene-2,6-naphthalate composition of the present invention has good blow moldability, and excellent hue and excellent weathering resistance (inhibition of strength degradation due to ultraviolet), which are necessary for molded products. Thus, the composition can be suitably used as alternative members of metal pressure vessels such as fire extinguishers and tanks. Additionally, molded products produced by using the polyethylene-2,6-naphthalate composition of the present invention (hereinafter, referred to as the PEN composition in some cases) are used as alternative members of a metal pressure vessel, enabling the weight to be reduced relative to the metal pressure vessel. Furthermore, having high transparency and crystallinity, the composition can be used for molded product applications requiring high strength and high transparency.

BRIEF DESCRIPTION OF DRAWINGS

FIG. 1 is one example of a schematic view of an uncapped molded bottle molded from the PEN composition of the present invention.

REFERENCE SIGNS LIST

1 SHOULDER OF MOLDED BOTTLE
2 BARREL PART OF MOLDED BOTTLE
3 BOTTOM OF MOLDED BOTTLE

DESCRIPTION OF EMBODIMENTS

The polyethylene-2,6-naphthalate composition of the present invention is a composition containing polyethylene-2,6-naphthalate, a phosphorus compound having a specific chemical structural formula, and each element of cobalt, manganese, and antimony. The PEN composition of the present invention is optionally copolymerized with other dicarboxylic acid and other diol component within a range not to impair the effect of the present invention, and optionally contains a small amount of a polyester composed of other dicarboxylic acid and other diol component. The amount of the dicarboxylic acid and the amount of the diol component optionally copolymerized are each independently 10 mol % or less on the basis of the 2,6-naphthalene dicarboxylic acid component. The amount of the aforementioned polyester composed of the dicarboxylic acid and other diol component optionally contained is 20% by weight or less on the basis of the weight of the PEN composition of the present invention.

Other dicarboxylic acid components can include aromatic dicarboxylic acid, aliphatic dicarboxylic acid, alicyclic dicarboxylic acid or their ester-forming derivatives. The aromatic dicarboxylic acids specifically include phthalic acid, isophthalic acid, terephthalic acid, 2,7-naphthalenedicarboxylic acid, 1,4-naphthalenedicarboxylic acid, 1,5-naphthalenedicarboxylic acid, 1,6-naphthalenedicarboxylic acid, 2,5-naphthalenedicarboxylic acid, 4,4'-diphenyl dicarboxylic acid, 4,4'-diphenoxy ethane dicarboxylic acid, 4,4'-diphenylsulphone dicarboxylic acid, 4,4'-diphenyl methane dicarboxylic acid, 4,4'-diphenylethane dicarboxylic acid, 4,4'-diphenylpropane dicarboxylic acid, 4,4'-diphenyl ketone dicarboxylic acid, diphenyl ether-4,4'-dicarboxylic acid, diphenyl thioether-4,4'-dicarboxylic acid, tetralin dicarboxylic acid, 6,6'-(alkylenedioxy) di-2-naphthoic acid. Alternatively, in the aromatic dicarboxylic acids and the like, the positions of substituent is not limited to the positions of 4,4'- and may be diphenyl dicarboxylic acids having substituents at the position of 2,4'-, 3,4-, 2,5'-, 2,2'-, 3,3'- and the like. Also, the ester-forming derivative of the aromatic dicarboxylic acid refers to a lower dialkyl ester having 1-6 carbon atoms, a lower diaryl ester having 6-10 carbon atoms and divalent acid halide, and can include more specifically dimethylester, diethyl ester, di-n-propyl ester, di-iso-propyl ester, di-n-butyl ester, di-sec-butyl ester, di-tert-butyl ester, dipentyl ester, dihexyl ester, dihexyl ester, dioctyl ester, dinonyl ester, didecyl ester, diphenyl ester, dibenzyl ester, dinaphthyl ester of the above-mentioned dicarboxylic acid, or aromatic dicarboxylic acid difluoride, aromatic dicarboxylic acid dichloride, aromatic dicarboxylic acid dibromide, aromatic dicarboxylic acid diiodide and the like. As for the dialkyl ester having 1 to 6 carbon atoms and diaryl ester having 6 to 10 carbon atoms, one or two or more of the hydrogen atoms are optionally substituted with a halogen atom, an alkyl ether group, an aryl ether group, an alkyl ester group, an aryl ester group, alkyl carbonyl groups such as acetyl group, aryl carbonyl groups such as benzoyl group and the like.

Other aliphatic dicarboxylic acids and alicyclic dicarboxylic acids includes specifically aliphatic dicarboxylic acid such as oxalic acid, malonic acid, succinic acid, glutaric acid, adipic acid, pimelic acid, suberic acid, azelaic acid, sebacic acid undecanedioic acid, dodecanedioic acid, tridecanedioic acid, tetradecanedioic acid, pentadecanedioic acid, hexadecanedioic acid, heptadecanedioic acid, octadecanedioic acid, nonadecanedioic acid, eicosanedioic acid, docosane dioic acid, fumaric acid, maleic acid, itaconic acid and the like; and alicyclic dicarboxylic acid such as 1,2-cyclohexanedicarboxylic acid, 1,3-cyclohexanedicarboxylic acid or 1,4-cyclohexanedicarboxylic acid, perhydronaphthalenedicarboxylic acid (decalindicarboxylic acid), dimer acid (reaction products obtained by Diels-Alder reaction of 9,11-conjugation linoleic acid and the disconjugate linoleic acid, etc.), cyclobutanedicarboxylic acid, tetramethylcyclobutanedicarboxylic acid, tricyclodecanedicarboxylic acid, norbornanedicarboxylic acid, adamantanedicarboxylic acid and the like. These are optionally anhydride and above-mentioned ester-forming derivatives. These dicarboxylic acids are more preferably used singly or in combination of two. These compounds preferably have a copolymerization proportion of 0 to 10 mol % and more preferably 2-8 mol % for the 2,6-naphthalenedicarboxylic acid. Furthermore, the compound, having 3 or more carboxyl groups in their molecules, such as trimellitic acid, trimesic acid, pyromellitic acid, gallic acid, tricarballylic acid and the like are optionally copolymerized in the range of 1 to 5 mol %.

Furthermore, in a part of the ethylene glycol component composing PEN compounds of the invention, diol components other than ethylene glycol components are optionally copolymerized. The diols preferably include diols having 2 to 20 carbon atoms, and specifically 1,2-propylene glycol, trimethylene glycol, tetramethylene glycol, pentamethylene glycol, hexamethylene glycol, heptamethylene glycol, octamethylene glycol, nonamethylene glycol, decamethylene glycol, undecamethylene glycol, dodecamethylene glycol, tridecamethylene glycol, tetradecamethylene glycol, pentadecamethylene glycol, hexadecamethylene glycol, neopentylglycol, diethylene glycol, triethylene glycol, tetraethylene glycol, dipropylene glycol, tripropylene glycol, tetrapentylene glycol, 2,2-diethyl-1,3-propanediol, 2-ethyl-2-butyl-1,3-propanediol, 2,2,4-trimethyl-1,3-pentanediol, 1,1-dihydroxycyclohexane, 1,2-dihydroxycyclohexane, 1,3-dihydroxycyclohexane, 1,4-dihydroxycyclohexane, 1,1-cyclohexanedimethanol, 1,2-cyclohexanedimethanol, 1,3-cyclohexanedimethanol, 1,4-cyclohexanedimethanol, 2,2,4,4-tetramethylcyclobutane-1,3-diol, p-bis(2-hydroxyethoxy)benzene, p-bis(3-hydroxypropoxy)benzene, 4,4'-bis(2-hydroxyethoxy)biphenyl, 4,4'-bis(3-hydroxypropoxy)

biphenyl, 2,2-bis(4-β-hydroxyethoxyphenyl)propane, 2,2-bis(4-γ-hydroxypropoxyphenyl)propane, 2,2-bis(4-ω-hydroxyethoxyethoxyphenyl)propane, bis(4-β-hydroxyethoxyphenyl)sulfone, bis(4-γ-hydroxypropoxyphenyl)sulfone, bis(4-ω-hydroxyethoxyethoxyphenyl)sulfone, 2,2-bis(4-β-hydroxyethoxycycloalkyl)propane, 2,2-bis(4-γ-hydroxypropoxycycloalkyl)propane, bis(4-β-hydroxyethoxycycloalkyl)sulfone, bis(4-γ-hydroxypropoxycycloalkyl)sulfone, 2,2,4,4-tetramethyl-1,3-cyclobutanediol, adamantanediol, spiroglycol, tricyclo[5.2.1.0$^{2,6}$]decanedimethanol. Other than two kinds of diols mentioned above, these diols are more preferably used singly or in combination of two. Further, the compounds having 3 or more hydroxyl groups in their molecules such as pentaerythritol, tetrakis(hydroxymethyl)methane and the like, are optionally copolymerized in the proportion of 1-3 mol % based on 100% of the aforementioned aromatic dicarboxylic acid components.

Further, in this invention, the compounds other than the aforementioned compounds such as dicarboxylic acids, diols, compounds having 3 or more carboxyl groups in their molecules, compounds having 3 or more hydroxyl groups in their molecules, namely, hydroxycarboxylic acids are optionally copolymerized as needed. The hydroxycarboxylic acids includes glycolic acid, lactic acid, glyceric acid, 2-hydroxybutyric acid, 3-hydroxybutyric acid, 4-hydroxybutyric acid, 2-hydroxyisobutyric acid, 2-hydroxy-2-methylbutyric acid, 2-hydroxyvaleric acid, 3-hydroxyvaleric acid, 4-hydroxyvaleric acid, 5-hydroxyvaleric acid, 6-hydroxycaproic acid, 10-hydroxystearic acid, malic acid, tartaric acid, citramalic acid, citric acid, isocitric acid, leucic acid, mevalonic acid, pantoic acid, ricinoleic acid, ricinelaidic acid, cerebronic acid, quinic acid, shikimic acid, 4-(β-hydroxy)ethoxybenzoic acid, β-propiolactone, β-butyrolactone, γ-butyrolactone, δ-valerolactone, E-caprolactone. The hydroxycarboxylic acids are preferably copolymerized in the range of 10 mol % or less based on the amount of 2,6-naphthalenedicarboxylic acid. In addition, monocarboxylic acid and monoalcohol are optionally copolymerized, if small amount, in a PEN compound of the present invention.

The PEN composition of the present invention can be obtained preferably by a production method in which an ester-forming derivative of a dicarboxylic acid component as aforementioned and a glycol such as ethylene glycol are subjected to transesterification followed by polycondensation to produce the composition or a production method in which a dicarboxylic acid and a glycol such as ethylene glycol are subjected to esterification followed by polycondensation to produce the composition. In the transesterification reaction, 10 to 30 mmol % of cobalt element derived from a cobalt compound is required to be included per mole of the dicarboxylic acid component constituting polyethylene-2,6-naphthalate, typified by a lower alkyl ester of 2,6-naphthalenedicarboxylic acid and the like. Here, the cobalt compound is added in order to inhibit yellowing, which is a cause of the hue deterioration of the molded product of the PEN composition, in addition to the effect as a transesterification catalyst. When the content is less than 10 mmol %, the effect will not be exerted. In contrast, when the content exceeds 30 mmol %, the hue becomes gray and deteriorates. The content is preferably 12 to 25 mmol %, more preferably 13 to 20 mmol %, and still more preferably 14 to 18 mmol %. Incidentally, examples of the lower alkyl ester of the naphthalenedicarboxylic acid preferably include naphthalenedicarboxylic acid dimethyl ester, naphthalenedicarboxylic acid diethyl ester, and naphthalenedicarboxylic acid diphenyl ester. As a method to add cobalt element in a range stated above, preferably adopted is a method in which cobalt compound that contains the corresponding equivalent amount of the element is added in the production step of the PEN composition. Also when the method of production via esterification reaction is employed, a cobalt compound in the same amount is preferably added in the step before the polycondensation reaction is completed, from the viewpoint of inhibiting hue deterioration.

The PEN composition of the present invention also preferably contains 10 to 50 mmol % of a phosphorus compound per mole of the dicarboxylic acid component constituting polyethylene-2,6-naphthalate. The content is preferably 15 to 45 mmol %, more preferably 18 to 40 mmol %, and still more preferably 20 to 35 mmol %. This phosphorus compound, which functions as a crystallization nucleating agent in the PEN composition, is preferably added during the transesterification reaction. Adding this phosphorus compound so as to reach 10 mmol % or more not only quenches the transesterification catalyst, but also enhances the crystallinity of the PEN composition as well as, in the present invention, provides strain hardening on blow molding. In contrast, when the amount of the phosphorus compound added is extremely larger than 50 mmol %, phenomena such as aggregation of the phosphorus compound may occur in the PEN composition of the present invention in some cases. This results in the elimination of transparency of the PEN composition, which is not preferable. Meanwhile, since the aforementioned strain hardening is imparted, the composition will have sufficient strength as molded bottles. Such a phosphorus compound is a phosphorus compound represented by the following formula (I). Also when the method of production via esterification reaction is employed, a phosphorous compound represented by the following formula (I) in the same amount is preferably added in the step before the polycondensation reaction is completed, from the viewpoint of inhibiting hue deterioration.

[Chem. 2]

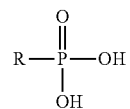

(I)

wherein R represents an alkyl group having 1 to 12 carbon atoms, an aryl group having 6 to 12 carbon atoms, or a benzyl group.

The compounds represented in the above formula (I) are organic phosphonic acids, and more specifically alkyl phosphonic acid, aryl phosphonic acid or benzyl phosphonic acid. The alkyl phosphonic acids include specifically methylphosphonic acid, ethylphosphonic acid, n-propylphosphonic acid, tert-butylphosphonic acid, n-pentylphosphonic acid, iso-pentylphosphonic acid, n-hexylphosphonic acid, iso-hexylphosphonic acid, heptylphosphonic acid, octylphosphonic acid, nonylphosphonic acid, decylphosphonic acid, undecylphosphonic acid, dodecylphosphonic acid, cyclohexylphosphonic acid, cyclooctylphosphonic acid, cyclodecanephosphonic acid. The aryl phosphonic acids include specifically phenylphosphonic acid, methylphenylpho sphonic acid, dimethylphenylpho sphonic acid, trimethylphenylphosphonic acid, tetramethylphenylphosphonic acid, pentamethylphenylpho sphonic acid, ethylphenylphosphonic acid, methylethylphenylphosphonic acid, diethyl-phenylphosphonic acid, monomethyldiethylphenylphosphonic acid, dimethyldiethylphenylphosphonic acid, triethylphenylphosphonic acid, propylphenylphosphonic acid, methylpropylphenylphosphonic acid, dimethylpropylphenylpho sphonic acid, ethylpropylphenylphosphonic acid, dipropylphenylphosphonic acid, butylphenylphosphonic acid, methylbutylphenylphosphonic acid, ethylbutylphenylpho sphonic acid, dimethylbutylphenylpho sphonic acid, pentylphenylphosphonic acid, methylpentylphenylphosphonic acid, hexylphenylphosphonic acid, naphthylphosphonic acid, methylnaphthylphosphonic acid, dimethylnaphthylphosphonic acid, ethylnaphthylphosphonic acid, and benzyl phosphonic acid. Among these compounds, a compound having a plurality of aliphatic groups is bonded at its phenyl group or naphthyl group is, needless to mention, included in the phosphorus compound represented in a general formula (I) of the present invention regardless of the substitution position in the phenyl group or the naphthyl group.

In the aforementioned transesterification reaction, 10 to 50 mmol % of the manganese element derived from a manganese compound is required to be included per mole of the dicarboxylic acid component constituting polyethylene-2,6-naphthalate, typified by a lower alkyl ester of a 2,6-naphthalene dicarboxylic acid and the like. Here, the manganese compound is added mainly for the purpose of the effect of the transesterification reaction catalyst. However, when the content is less than 10 mmol %, the effect will not be exerted. In contrast, when the content exceeds 50 mmol %, the hue becomes gray and deteriorates. The content is preferably 15 to 45 mmol %, more preferably 18 to 40 mmol %, and still more preferably 20 to 35 mmol %. As a method to add manganese element in a range stated above, preferably adopted is a method in which a manganese compound that contains the corresponding equivalent amount of the element is added in the production method of the PEN composition.

Additionally, in the present invention, the phosphorus compound represented by the formula (I) is added for the purpose of both increasing the crystallinity of polyester and providing strain hardening on blow molding. Furthermore, in the present invention, the ratio of the content of the phosphorus compound to the content of the manganese element derived from the manganese compound (P/Mn) (molar ratio) is required to be in the range of 0.50 to 1.28. When this molar ratio is less than 0.50, the crystallinity of the PEN composition is not enhanced. Thus, no strain hardening required on blow molding is provided, and blow molding becomes difficult to be performed. Moreover, the transesterification catalyst is not completely quenched, and the thermal stability may deteriorate. Furthermore, the influence may disadvantageously lead to coloring of the PEN composition and decrease in the physical properties on melt molding. Inversely, when this molar ratio exceeds 1.28, even though the crystallinity of the PEN composition is improved and the strain hardening and thermal stability on blow molding are improved, the hue of the PEN composition considerably deteriorates, resulting in the hue deterioration of molded products and inferior visibility of the bottle contents, which is not preferable. The molar ratio is preferably 0.55 to 1.27, more preferably 0.60 to 1.25, and still more preferably 0.65 to 1.23.

Various metal compounds are used as a polymerization catalyst used in the polyester production step. In the case of a polyester in which a good hue is required, germanium (Ge) compounds such as germanium dioxide and titanium (Ti) compounds such as tetrabutoxy titanium are widely used because the compounds have high polymerization activity and the hue of the resulting polyester resin is relatively good. However, although having high polymerization activity and a good hue, a Ge compound has relatively low polymerization activity for polyethylene naphthalate resin. Thus, the amount of the compound added is increased, and problems occur such as increase in the production cost. When a Ti compound is used as the polymerization catalyst, the amount of the compound added becomes smaller due to its high polymerization activity, thus reducing the production cost. However, the compound bears problems such as deterioration in the quality of molded products because the compound yellows the hue of the polyester resin and the quality on melt molding considerably deteriorates.

In contrast, an antimony (Sb) compound such as antimony trioxide is used as the polymerization catalyst, the compound is particularly preferable because the cost problem, the hue deterioration of the polyester resin, and the quality deterioration as described above are inhibited and the aforementioned problems are improved. When the amount of antimony trioxide added is too small, the productivity is decreased due to decrease in polymerization reactivity. Conversely, when the amount is too large, the thermal stability becomes inferior, leading to decrease in the physical properties on melt forming and deterioration in the hue. Therefore, 10 to 25 mmol % of antimony trioxide is preferably contained per mole of the dicarboxylic acid component substantially constituting polyethylene-2,6-naphthalate. The content is preferably 12 to 23 mmol %, more preferably 13 to 22 mmol %, and still more preferably 14 to 21 mmol %. The ratios of the cobalt element, the phosphorous element, the manganese element, the antimony element (per mole of the dicarboxylic acid component constituting polyethylene-2,6-naphthalate), and the phosphorous element to the manganese element aforementioned within the above-described numerical ranges can be achieved by adjusting the amount of each corresponding compound containing each element added in the PEN composition production step.

The intrinsic viscosity of the polyethylene-2,6-naphthalate composition obtained by the present invention is required to be 0.60 to 1.50 dL/g from the point of the mechanical strength and the moldability. The intrinsic viscosity is preferably 0.75 to 1.45 dL/g, more preferably 0.80 to 1.40 dL/g, and still more preferably 0.85 to 1.30 dL/g. When the intrinsic viscosity is less than 0.60 dL/g, the mechanical strength of the polyester molded product is inferior. Moreover, the strain hardening, which may be caused by entanglements in the amorphous regions of polyethylene-2,6-naphthalate composition during blow molding, becomes unlikely to occur, and thus the blow moldability may become inferior. In contrast, the intrinsic viscosity more than 1.50 dL/g is not preferable because the fluidity during melt molding is reduced to render the molding processability inferior, although the strain hardening on blow molding becomes likely to occur. The intrinsic viscosity can be increased by employing melt polymerization conditions, as performed in usual steps for producing polyester, such as increasing the polymerization temperature, adjusting the degree of decompression in the reaction tank to achieve a higher vacuum, extending the polymerization time, and effectively stirring melt polyester having a high melt viscosity so as to increase the surface area. The intrinsic viscosity can be increased also by performing solid-phase polymerization after melt polymerization.

The crystallization temperature during the period of temperature increase of the polyethylene-2,6-naphthalate composition obtained by the present invention is preferably 180 to 205° C., and the crystallization temperature during the period of temperature decrease is 190 to 210° C. A composition having a crystallization temperature during the period of temperature increase of 180° C. or less and a crystallization temperature during the period of temperature decrease of 210° C. or more is not preferable because melt polyester is immediately solidified due to its excessively high crystallinity, in other words, excessively high crystallization rate, and injection molding is difficult. Conversely, a composition having a crystallization temperature during the period of temperature increase of 205° C. or more and a crystallization temperature during the period of temperature decrease of 190° C. or less is not preferable because the composition cannot have strain hardening properties due to its excessively low crystallinity, in other words, excessively slow crystallization rate, and blow molding becomes difficult. Crystallization temperatures during the period of temperature increase and during the period of temperature decrease within this range can be achieved by adding an amount of the crystallization nucleating agent represented by the formula (I) within the range of the formula (2) during transesterification reaction. Crystallization temperatures during the period of temperature increase and during the period of temperature decrease are more preferably, respectively, 185 to 202° C. and 195 to 208° C., and still more preferable 190 to 200° C. and 198 to 205° C. Incidentally, the crystallization temperature during the period of temperature increase and the crystallization temperature during the period of temperature decrease are values obtained by measuring a sample using DSC (differential scanning calorimetry) at a temperature rise rate of 20° C./minute and a temperature drop rate of 10° C./minutes, respectively. More detailed conditions are provided below. In order to allow the crystallization temperature during the period of temperature increase and the crystallization temperature during the period of temperature decrease to fall within the above-described numerical range, the cobalt compound, the phosphorus compound presented by the formula (I) described above, the manganese compound, and the antimony compound are used under conditions satisfying the expressions (1) to (3) to produce a PEN composition.

The molded bottle formed from the polyethylene-2,6-naphthalate composition in the present invention preferably has a haze of 5% or less. When the bottle haze is higher than 5%, the molded bottle is difficult to be used as a bottle due to its inferior transparency and the resulting inferior visibility of the contents. Incidentally, a haze within this value range can be achieved by blow molding the composition using an amount of the catalyst within the range of the formulas (1) to (3) and setting the intrinsic viscosity within the range of the formula (4) to reduce thickness unevenness on the molded bottle. Incidentally, for forming a molded bottle, either of direct blow molding or injection blow molding can be employed as appropriate. With these techniques, bottles for containers of cosmetics or detergents and the like, cans for containers, tanks, hollow molded products such as pipes, ducts, or hoses and the like also can be molded.

The molded product formed from the polyethylene-2,6-naphthalate composition in the present invention has crystallinity of preferably 20% or more, and more preferably 25% or more, from the viewpoint of chemical resistance. When the crystallinity is less than 20%, the product is susceptible to contamination by chemicals, and thus, is difficult to be used as fire extinguishers or bottles for medical use. Incidentally, crystallinity of 20% or more can be achieved by blow molding the composition using an amount of the crystallization nucleating agent represented by the formula (I) within the range of the formula (2) and setting the intrinsic viscosity within the range of the formula (4) to reduce thickness unevenness on the molded bottle.

The molded product formed from the polyethylene-2,6-naphthalate composition in the present invention preferably has tensile strength of 200 N/mm$^2$ or more after 200 hours of ultraviolet irradiation from the viewpoint of weathering resistance. The tensile strength of less than 200 N/mm$^2$ is not preferable because weathering resistance of the molded product deteriorates due to ultraviolet absorption. Incidentally, tensile strength of 200 N/mm$^2$ or more can be achieved by blow molding the composition using an amount of the crystallization nucleating agent within the range of the formula (2) and setting the intrinsic viscosity within the range of the formula (4) to reduce thickness unevenness on the molded bottle.

EXAMPLES

The present invention will be described in detail referring to Examples, while the present invention is not limited to Examples below within the scope of the invention. Incidentally, the properties of polyethylene-2,6-naphthalate composition obtained were measured in accordance with the following methods. Incidentally, the notation "parts" hereinafter refers to "parts by weight", unless otherwise noted.

(A) Intrinsic Viscosity (IV) Measurement

Intrinsic viscosity was measured in accordance with a conventional method in a solvent, phenol/2,4,6-trichlorophenol=3/2 (weight ratio), at 35° C.

(B) Measurement of Glass Transition Temperature (Tg), Melting Point (Tm), and Crystallization Temperatures (Tci: Crystallization Temperature During the Period of Temperature Increase and Tcd: Crystallization Temperature During the Period of Temperature Decrease)

(a) Glass Transition Temperature and Melting Point

A polyethylene-2,6-naphthalate composition sample dried at 25° C. for 24 hours was used to measure Tg and Tm while raising the temperature at a temperature rise rate of 20° C./minute by using a differential scanning calorimeter (DSC). About 10 mg of the measurement specimen was weighed in an aluminum pan (manufactured by TA Instruments), and the measurements were performed under nitrogen atmosphere.

(b) Crystallization Temperature During the Period of Temperature Decrease

A polyethylene terephthalate composition sample was heated to 300° C. using a differential scanning calorimeter under the conditions of nitrogen gas flow and a temperature rise rate of 20° C./minute. Then, after maintaining the sample at 300° C. for 2 minutes, an exothermic peak appearing under the condition of a temperature decrease rate of 10° C./minute was observed, and the energy was calculated from the peak area (the temperature at the top of the exothermic peak was written as Tcd [crystallization temperature during the period of temperature decrease]).

(c) Crystallization Temperature During the Period of Temperature Increase

A polyethylene terephthalate composition sample was heated to 300° C. under the condition of a temperature rise rate of 20° C./minute. Subsequently, the sample was maintained and at 300° C. for 2 minutes and the molten sample was quenched and solidified in liquid nitrogen to obtain a quenched and solidified composition. Then, by using a differential scanning calorimeter on the quenched and solidified composition obtained, an exothermic peak appearing under the condition of nitrogen gas flow and a temperature increase rate of 20° C./minute was observed, and the energy was calculated from the peak area (the temperature at the top of the exothermic peak was written as Tci [crystallization temperature during the period of temperature increase]).

(C) Element Content in PEN Composition

The element content of polyethylene-2,6-naphthalate composition obtained by the present invention was measured by X-ray fluorescence (manufactured by Rigaku Corporation, Rotaflex RU200).

(D) Bottle Moldability Evaluation

A polyethylene-2,6-naphthalate composition sample dried at 160° C. for 5 hours or more was molded into a preform of 55 g at a molding temperature of 295° C. by using an injection molding machine FN2000 manufactured by NISSEI PLASTIC INDUSTRIAL CO., LTD. After the preform was heated for a predetermined time, it was stretch blow molded by using a biaxial stretch blow molding machine (FDB-1D) manufactured by Frontier, Inc. to mold a bottle having an internal capacity of 1.5 L and a barrel-part thickness of 300 μm by injection blow molding method. This 1.5 L molded bottle was used to evaluate transparency (haze), hue, weathering resistance, and additionally, blow moldability such as crystallinity and the like. A polyethylene-2,6-naphthalate composition sample also dried at 160° C. for 5 hours or more was molded by using a molding machine ASB-50TH manufactured by NISSEI ASB MACHINE CO., LTD. into a bottle having an internal capacity of 500 mL and a barrel-part thickness of 300 μm by direct blow molding method.

(E) Transparency Evaluation (Haze Measurement)

In the above 1.5 L bottle molding step, a preform was heated for 150 seconds and blow molded to obtain a 1.5 L molded bottle having a barrel-part thickness of 300 μm. The barrel part of the 1.5 L molded bottle was cut out and checked by using a haze meter NDH2000 manufactured by NIPPON DENSHOKU INDUSTRIES CO., LTD. Bottles having cloudiness (haze) of 5.0% or less were evaluated as "passed" and those having a haze value of more than 5.0% were evaluated as "failed".

(F) Hue Evaluation (Col-b Measurement)

The barrel part of a 1.5 L molded bottle molded by heating a preform for 150 seconds was cut out and measured for Col-b by using a color and a color difference meter ZE-2000 manufactured by NIPPON DENSHOKU INDUSTRIES CO., LTD. As a result, bottles having Col-b of 2.0 or less were evaluated as "passed" and those having Col-b of more than 2.0 were evaluated as "failed".

(G) Weathering Resistance Test

The barrel part of a 1.5 L molded bottle molded by heating the preform aforementioned for 150 seconds was irradiated for 200 hours with ultraviolet light using a xenon lamp. After the irradiation, the barrel part was punched out into No. 2 specimens (JISK7113-No. 2 ½ type) using a punching press (model IMC-184F) manufactured by IMOTO MACHINERY CO., LTD., and the tensile strength was measured by using an Autograph (AG-100B) manufactured by SHIMADZU CORPORATION. Specimens having a tensile strength of 200 N/mm² or more were evaluated as "passed" on weathering resistance, and those having tensile strength of less than 200 N/mm² were evaluated as "failed" on weathering resistance.

(H) Blowing Width (Indicator for Blow Moldability Evaluation)

A 1.5 L molded bottle was molded from a preform while the time for heating the preform was varied from 120 to 220 seconds in the operation shown in aforementioned (D). The barrel part of the molded bottle obtained was subjected to haze measurement. Then, the haze of the barrel part of the molded bottle was plotted on the vertical axis, and the time for heating the preform was plotted on the horizontal axis. The difference between the maximum value and the minimum value of the time for heating the preform at which the haze value of the molded bottle reached 5% or less was evaluated as the blowing width in the PEN composition. It can be said that a composition having a larger blowing width in seconds has more options for the conditions of molding bottle having little haze and has good moldability. It also can be said that a composition having a shorter lower limit of the blowing width in seconds can reduce the molding time and has good moldability. In contrast, if the lower limit is longer, the molding time becomes longer, and moreover, the melt viscosity of the PEN composition for the preform becomes decreased. As a result, the shoulder of the molded bottle is likely to be stretched and its thickness is likely to be smaller, while the bottom of the molded bottle is unlikely to be stretched and its thickness is likely to be larger. In other words, thickness unevenness of the molded bottle is likely to occur.

(I) Thickness Unevenness (Indicator for Blow Moldability Evaluation)

When a 1.5 L molded bottle was blow molded under the conditions including the time for heating the preform of 150 seconds, the thickness of the shoulder of the molded bottle, at which the preform is known to be stretched most, was measured as the minimum thickness, and the thickness of the bottom of the molded bottle, at which the preform is known to be stretched least, was measured as the maximum thickness. Additionally, the difference between the maximum thickness and the minimum thickness was calculated as the thickness unevenness.

(J) Crystallinity Unevenness Measurement (Indicator for Blow Moldability Evaluation)

When a 1.5 L molded bottle was blow molded under the conditions including the time for heating the preform of 150 seconds, the thickness of the shoulder of the molded bottle, at which the preform is known to be stretched most, was measured as the minimum thickness, and the thickness of the bottom of the molded bottle, at which the preform is known to be stretched least, was measured as the maximum thickness. Sampling was performed and the sampled specimens were measured for the density by using a density gradient tube to determine the crystallinity $\chi_c$ by using the following expression:

$$\chi_c = \{d_c \times (d - d_a)\} / \{d \times (d_c - d_a)\} \times 100$$

wherein $d_c$ is the density at the complete crystal phase, $d_a$ is the density at the complete amorphous phase, and d is the density actually measured. In this case, the crystallinity was calculated using $d_c = 1.407$ g/cm³ and $d_a = 1.325$ g/cm³.

(K) Fracture Stress

After the barrel part of a 1.5 L molded bottle blow molded under the conditions for the time for heating the preform of 150 seconds was punched out into No. 2 specimens using a punching press, the fracture stress was evaluated by using an AG-Xplus series Autograph (AG-100B) manufactured by SHIMADZU CORPORATION.

Example 1

To a reaction tank, 100 parts of dimethyl 2,6-naphthalene dicarboxylate ester (hereinafter, abbreviated as NDC in some cases) and 51 parts of ethylene glycol (hereinafter, abbreviated as EG in some cases) were loaded. Transesterification reaction was started by using cobalt acetate tetrahydrate as the hue-adjusting agent in a total amount of 15 mmol % per mole of NDC and manganese acetate tetrahydrate as the transesterification catalyst in the total amount of 30 mmol % per mole of NDC. After the transesterification reaction was started and after 20 minutes passed since methanol had been distilled out, antimony trioxide as the polymerization catalyst in a total amount of 15 mmol % per mole of NDC was added to continue the transesterification reaction. Then, after about one hour, phenylphosphonic acid as the crystallization nucleating agent in a total amount of 20 mmol % per mole of NDC was added to terminate the transesterification reaction. Subsequently, polycondensation reaction was conducted under the conditions of high temperature and high vacuum. Then, the polycondensation product was withdrawn from the reaction tank and formed into strand-type prepolymer chips. The prepolymer obtained had an intrinsic viscosity of 0.65 dL/g. After the prepolymer obtained was further crystallized, the prepolymer was subjected to solid-phase polymerization to obtain a PEN composition having an intrinsic viscosity of 0.90 dL/g.

For the polyethylene-2,6-naphthalate composition obtained, crystallization temperature measurement by DSC, measurement of the residual metal content by X-ray Fluorescence, molding into bottles, measurement of the thickness of the molded bottle, measurement of the transparency (haze) of the barrel part of the molded bottle, evaluation of the Col-b of the barrel part of the molded bottle, evaluation of the weathering resistance of the barrel part of the molded bottle, and the crystallinity of the molded bottle were evaluated. The results are shown in Tables 1 and 2.

Example 2

A polyethylene-2,6-naphthalate composition was obtained substantially similarly to Example 1 except that the amount of phenylphosphonic acid as the crystallization nucleating agent added was changed to 30 mmol % per mole of NDC.

For the polyethylene-2,6-naphthalate composition obtained, crystallization temperature measurement by DSC, measurement of the residual metal content by X-ray Fluorescence, molding into bottles, measurement of the thickness of the molded bottle, measurement of the transparency (haze) of the barrel part of the molded bottle, evaluation of the Col-b of the barrel part of the molded bottle, evaluation of the weathering resistance of the barrel part of the molded bottle, and the crystallinity of the molded bottle were evaluated. The results are shown in Tables 1 and 2.

Example 3

A polyethylene-2,6-naphthalate composition was obtained substantially similarly to Example 1 except that the amount of phenylphosphonic acid as the crystallization nucleating agent added was changed to 36 mmol % per mole of NDC. For the polyethylene-2,6-naphthalate composition obtained, crystallization temperature measurement by DSC, measurement of the residual metal content by X-ray Fluorescence, measurement of the thickness of the molded bottle, measurement of the transparency (haze) of the barrel part of the molded bottle, evaluation of the Col-b of the barrel part of the molded bottle, evaluation of the weathering resistance of the barrel part of the molded bottle, and the crystallinity of the molded bottle were evaluated. The results are shown in Tables 1 and 2.

Example 4

A polyethylene-2,6-naphthalate composition was obtained substantially similarly to Example 1 except that the amount of antimony trioxide as the polymerization catalyst added was changed to 20 mmol % per mole of NDC. For the polyethylene-2,6-naphthalate composition obtained, crystallization temperature measurement by DSC, measurement of the residual metal content by X-ray Fluorescence, molding into bottles, measurement of the thickness of the molded bottle, measurement of the transparency (haze) of the barrel part of the molded bottle, evaluation of the Col-b of the barrel part of the molded bottle, evaluation of the weathering resistance of the barrel part of the molded bottle, and the crystallinity of the molded bottle were evaluated. The results are shown in Tables 1 and 2.

Example 5

A polyethylene-2,6-naphthalate composition was obtained substantially similarly to Example 2 except that the amount of antimony trioxide as the polymerization catalyst added was changed to 20 mmol % per mole of NDC. For the polyethylene-2,6-naphthalate composition obtained, crystallization temperature measurement by DSC, measurement of the residual metal content by X-ray Fluorescence, molding into bottles, measurement of the thickness of the molded bottle, measurement of the transparency (haze) of the barrel part of the molded bottle, evaluation of the Col-b of the barrel part of the molded bottle, evaluation of the weathering resistance of the barrel part of the molded bottle, and the crystallinity of the molded bottle were evaluated. The results are shown in Tables 1 and 2.

Example 6

A polyethylene-2,6-naphthalate composition was obtained substantially similarly to Example 3 except that the amount of antimony trioxide as the polymerization catalyst added was changed to 20 mmol % per mole of NDC. For the polyethylene-2,6-naphthalate composition obtained, crystallization temperature measurement by DSC, measurement of the residual metal content by X-ray Fluorescence, molding into bottles, measurement of the thickness of the molded bottle, measurement of the transparency (haze) of the barrel part of the molded bottle, evaluation of the Col-b of the barrel part of the molded bottle, evaluation of the weathering resistance of the barrel part of the molded bottle, and the crystallinity of the molded bottle were evaluated. The results are shown in Tables 1 and 2.

Comparative Example 1

A polyethylene-2,6-naphthalate composition was obtained substantially similarly to Example 1 except that the amount of phenylphosphonic acid as the crystallization nucleating agent added was changed to 40 mmol % per mole of NDC. For the polyethylene-2,6-naphthalate composition obtained, crystallization temperature measurement by DSC, measurement of the residual metal content by X-ray Fluorescence, molding into bottles, measurement of the thickness of the molded bottle, measurement of the transparency (haze) of the barrel part of the molded bottle, evaluation of the Col-b of the barrel part of the molded bottle, evaluation of the weathering resistance of the barrel part of the molded bottle, and the crystallinity of the molded bottle were evaluated. The results are shown in Tables 1 and 2.

Comparative Example 2

A polyethylene-2,6-naphthalate composition was obtained substantially similarly to Example 1 except that the amount of phenylphosphonic acid as the crystallization nucleating agent added was changed to 9 mmol % per mole of NDC. For the polyethylene-2,6-naphthalate composition obtained, crystallization temperature measurement by DSC, measurement of the residual metal content by X-ray Fluorescence, molding into bottles, measurement of the thickness of the molded bottle, measurement of the transparency (haze) of the barrel part of the molded bottle, evaluation of the Col-b of the barrel part of the molded bottle, evaluation of the weathering resistance of the barrel part of the molded bottle, and the crystallinity of the molded bottle were evaluated. The results are shown in Tables 1 and 2. As the result of the evaluation, the blowing width was 40 seconds, but the value of the 40 seconds was obtained at a time zone where the heating time was longer than in Examples 1 to 6. Thus, the molding rate was inferior and the thickness unevenness was also large.

Comparative Example 3

A polyethylene-2,6-naphthalate composition was obtained substantially similarly to Example 1 except that the amount of phenylphosphonic acid as the crystallization nucleating agent added was changed to 0 mmol % per mole of NDC. For the polyethylene-2,6-naphthalate composition obtained, crystallization temperature measurement by DSC, measurement of the residual metal content by X-ray Fluorescence, molding into bottles, measurement of the thickness of the molded bottle, measurement of the transparency (haze) of the barrel part of the molded bottle, evaluation of the Col-b of the barrel part of the molded bottle, evaluation of the weathering resistance of the barrel part of the molded bottle, and the crystallinity of the molded bottle were evaluated. The results are shown in Tables 1 and 2. As the result of the evaluation, the blowing width was 40 seconds, but the 40 seconds was at a time zone where the heating time was long. Thus the molding rate was inferior, and the difference between the maximum thickness and the minimum thickness of the molded bottle (thickness unevenness) was also large.

Comparative Example 4

A polyethylene-2,6-naphthalate composition was obtained substantially similarly to. Example 1 except that the amount of antimony trioxide as the polymerization catalyst added was changed to 5 mmol % per mole of NDC. For the polyethylene-2,6-naphthalate composition obtained, crystallization temperature measurement by DSC, measurement of the residual metal content by X-ray Fluorescence, molding into bottles, measurement of the thickness of the molded bottle, measurement of the transparency (haze) of the barrel part of the molded bottle, evaluation of the Col-b of the barrel part of the molded bottle, evaluation of the weathering resistance of the barrel part of the molded bottle, and the crystallinity of the molded bottle were evaluated. The results are shown in Tables 1 and 2. As the result of the evaluation, the molded product had large thickness unevenness as well as inferior fracture stress.

Comparative Example 5

A polyethylene-2,6-naphthalate composition was obtained substantially similarly to Example 1 except that the amount of cobalt acetate tetrahydrate as the hue-adjusting agent was changed to 5 mmol % per mole of NDC. For the polyethylene-2,6-naphthalate composition obtained, crystallization temperature measurement by DSC, measurement of the residual metal content by X-ray Fluorescence, molding into bottles, measurement of the thickness of the molded bottle, measurement of the transparency (haze) of the barrel part of the molded bottle, evaluation of the Col-b of the barrel part of the molded bottle, evaluation of the weathering resistance of the barrel part of the molded bottle, and the crystallinity of the molded bottle were evaluated. The results are shown in Tables 1 and 2.

Comparative Example 6

A polyethylene-2,6-naphthalate composition was obtained substantially similarly to Example 5 except that the amount of cobalt acetate tetrahydrate as the hue-adjusting agent was changed to 0 mmol % per mole of NDC. For the polyethylene-2,6-naphthalate composition obtained, crystallization temperature measurement by DSC, measurement of the residual metal content by X-ray Fluorescence, molding into bottles, measurement of the thickness of the molded bottle, measurement of the transparency (haze) of the barrel part of the molded bottle, evaluation of the Col-b of the barrel part of the molded bottle, evaluation of the weathering resistance of the barrel part of the molded bottle, and the crystallinity of the molded bottle were evaluated. The results are shown in Tables 1 and 2.

TABLE 1

| | | PEN composition fundamental physical properties | | | | | | | | |
|---|---|---|---|---|---|---|---|---|---|---|
| | Intrinsic | Thermal analysis results | | | | Content of each element | | | | |
| | viscosity dL/g | Tg °C. | Tci °C. | Tm °C. | Tcd °C. | Co mmol % | Mn mmol % | P mmol % | Sb mmol % | P/Mn (—) |
| Example 1 | 0.90 | 118 | 199 | 265 | 203 | 15 | 30 | 20 | 15 | 0.67 |
| Example 2 | 0.90 | 118 | 199 | 265 | 204 | 15 | 30 | 30 | 15 | 1.00 |
| Example 3 | 0.90 | 118 | 199 | 265 | 204 | 15 | 30 | 36 | 15 | 1.20 |
| Example 4 | 0.90 | 118 | 199 | 265 | 203 | 15 | 30 | 20 | 20 | 0.67 |
| Example 5 | 0.90 | 118 | 199 | 265 | 204 | 15 | 30 | 30 | 20 | 1.00 |
| Example 6 | 0.90 | 118 | 199 | 265 | 204 | 15 | 30 | 36 | 20 | 1.20 |
| Comparative example 1 | 0.90 | 118 | 199 | 265 | 204 | 15 | 30 | 40 | 15 | 1.33 |
| Comparative example 2 | 0.90 | 118 | 215 | 265 | 190 | 15 | 30 | 9 | 15 | 0.30 |

TABLE 1-continued

| | PEN composition fundamental physical properties | | | | | | | | |
|---|---|---|---|---|---|---|---|---|---|
| | Intrinsic viscosity dL/g | Thermal analysis results | | | | Content of each element | | | |
| | | Tg °C. | Tci °C. | Tm °C. | Tcd °C. | Co mmol % | Mn mmol % | P mmol % | Sb mmol % | P/Mn (—) |
| Comparative example 3 | 0.90 | 118 | Not detected | 263 | 124 | 15 | 30 | 0 | 15 | 0.00 |
| Comparative example 4 | 0.55 | 118 | 199 | 265 | 204 | 15 | 30 | 20 | 5 | 0.67 |
| Comparative example 5 | 0.90 | 118 | 199 | 265 | 204 | 5 | 30 | 20 | 15 | 0.67 |
| Comparative example 6 | 0.90 | 118 | 199 | 265 | 203 | 0 | 30 | 20 | 15 | 0.67 |

Tg represents the glass transition temperature, Tci represents the crystallization temperature during the period of temperature increase, Tm represents the melting point, and Tcd represents the crystallization temperature during the period of temperature decrease.

TABLE 2

| | Molded product evaluation | | | | | | | | | | |
|---|---|---|---|---|---|---|---|---|---|---|---|
| | | Thickness | | | Crystallinity | | | | | Weathering | |
| | Blowing width S | Minimum thickness: A μm | Maximum thickness: B μm | B − A μm | Minimum crystallinity: C % | Maximum crystallinity: D % | D − C % | Haze % | Col-b (—) | resistance evaluation (—) | Fracture stress MPa |
| Example 1 | 40 | 310 | 800 | 490 | 25 | 35 | 10 | 5.0 | 0.6 | OK | 205 |
| Example 2 | 40 | 305 | 800 | 495 | 25 | 35 | 10 | 5.0 | 1.3 | OK | 205 |
| Example 3 | 40 | 305 | 800 | 495 | 25 | 35 | 10 | 5.0 | 1.7 | OK | 205 |
| Example 4 | 40 | 310 | 800 | 490 | 25 | 35 | 10 | 5.0 | 0.3 | OK | 205 |
| Example 5 | 40 | 310 | 800 | 490 | 25 | 35 | 10 | 5.0 | 1.6 | OK | 205 |
| Example 6 | 40 | 310 | 800 | 490 | 25 | 35 | 10 | 5.0 | 1.8 | OK | 205 |
| Comparative example 1 | 40 | 305 | 810 | 505 | 25 | 36 | 11 | 5.0 | 3.3 | OK | 205 |
| Comparative example 2 | 40* | 295 | 950 | 655 | 19 | 29 | 10 | 10.0 | 1.0 | NG | 205 |
| Comparative example 3 | 40* | 290 | 900 | 610 | 20 | 30 | 10 | 10.0 | 0.5 | NG | 200 |
| Comparative example 4 | 40 | 275 | 955 | 680 | 22 | 33 | 11 | 5.0 | 0.3 | OK | 195 |
| Comparative example 5 | 40 | 310 | 800 | 490 | 25 | 35 | 10 | 5.0 | 3.5 | OK | 205 |
| Comparative example 6 | 40 | 310 | 800 | 490 | 25 | 35 | 10 | 5.0 | 4.5 | OK | 205 |

*40 seconds of the blowing width exists in a region where the heating time is 150 seconds or more.

The polyethylene-2,6-naphthalate composition of the present invention has good blow moldability, excellent hue, excellent transparency, and additionally excellent weathering resistance (inhibition of strength degradation due to ultraviolet), which are necessary for molded products. Thus, the composition can be suitably used as alternative members of metal pressure vessels such as fire extinguishers and tanks, enabling the weight to be reduced. The composition exhibits large industrial significance.

The invention claimed is:

1. A polyethylene-2,6-naphthalate composition comprising a phosphorus compound represented by the following formula (I), cobalt element derived from a cobalt compound, manganese element derived from a manganese compound, and antimony element derived from an antimony compound, the content of each of the elements simultaneously satisfying the following expressions (1) to (4):

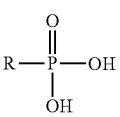

(I)

wherein R represents an alkyl group having 1 to 12 carbon atoms, an aryl group having 6 to 12 carbon atoms, or a benzyl group;

$$10 \leq Co \leq 30 \text{ mmol \%} \quad (1)$$

$$0.50 \leq P/Mn \leq 1.28 \quad (2)$$

$$10 \leq Sb \leq 25 \text{ mmol \%} \quad (3)$$

$$0.60 \leq IV \leq 1.50 \text{ dL/g} \quad (4)$$

in the expressions (1) to (4), Co, P, Mn, and Sb respectively represent the content of the cobalt element derived from the cobalt compound, the content of the phosphorus compound represented by the formula (I), the content of the manganese element derived from the manganese compound, and the content of the antimony element derived from the antimony compound, per mole of a dicarboxylic acid component constituting polyethylene-2,6-naphthalate in the polyethylene-2,6-naphthalate composition, and IV represents the intrinsic viscosity of the polyethylene-2,6-naphthalate composition; and wherein the dicarboxylic acid component constituting polyethylene-2,6-naphthalate is only 2,6-naphthalene dicarboxylic acid.

2. The polyethylene-2,6-naphthalate composition according to claim 1, wherein the intrinsic viscosity (IV) of the polyethylene-2,6-naphthalate composition satisfies the following expression (5):

$$0.80 \leq IV \leq 1.50 \text{ dL/g} \qquad (5).$$

3. The polyethylene-2,6-naphthalate composition according to claim 1, wherein the content of the phosphorus compound represented by the general formula (I) is 10 to 50 mmol % per mole of the dicarboxylic acid component constituting polyethylene naphthalate.

4. A polyester molded product comprising the polyethylene-2,6-naphthalate composition according to claim 1.

5. The polyester molded product according to claim 4, wherein the polyester molded product is a direct blow molded product.

6. The polyester molded product according to claim 4, wherein the polyester molded product is an injection blow molded product.

7. The polyester molded product according to claim 4, wherein the polyester molded product is a hollow molded product.

* * * * *